United States Patent [19]

Häggström

[11] Patent Number: 5,441,755
[45] Date of Patent: Aug. 15, 1995

[54] METHOD OF BAKING USING A PLURALITY OF PIVOTABLE PLATES

[76] Inventor: Thorsten Häggström, Box 2440 B, S-892 99 Domsjö, Sweden

[21] Appl. No.: 39,493
[22] PCT Filed: Oct. 29, 1991
[86] PCT No.: PCT/SE91/00726
§ 371 Date: Apr. 30, 1993
§ 102(e) Date: Jun. 30, 1993
[87] PCT Pub. No.: WO92/07469
PCT Pub. Date: May 14, 1992

[30] Foreign Application Priority Data

Nov. 1, 1990 [SE] Sweden .................................. 9003487

[51] Int. Cl.6 .................................................. A21C 9/06
[52] U.S. Cl. .................................. 426/502; 426/496; 426/505; 426/520; 99/422; 99/423; 99/644
[58] Field of Search ............... 426/496, 505, 520, 502; 99/423, 422, 644

[56] References Cited

U.S. PATENT DOCUMENTS 3,718,487  2/1973  Brunner ................................. 99/423
4,733,608  3/1988  Merdy ................................... 99/423

FOREIGN PATENT DOCUMENTS 3119783 12/1982 Germany .

Primary Examiner—Helen Pratt

[57] ABSTRACT

A method and device for baking dough or batter comprising at least two heatable plates, each of them having a top side, wherein the dough or batter is automatically put on the first and second heated plates for making pastries, pancakes and the like. The method is characterized in that the dough or the batter is baked on its one side on the top side of the first plate whereafter the partly baked dough or batter, is transferred to the second plate and is baked on its other side. The pastry/pancake, completely baked on the second plate is pivotably transferred to a laying off place. Using the device, a plurality of pastries, pancakes, and the like can be automatically and systematically produced.

14 Claims, 3 Drawing Sheets

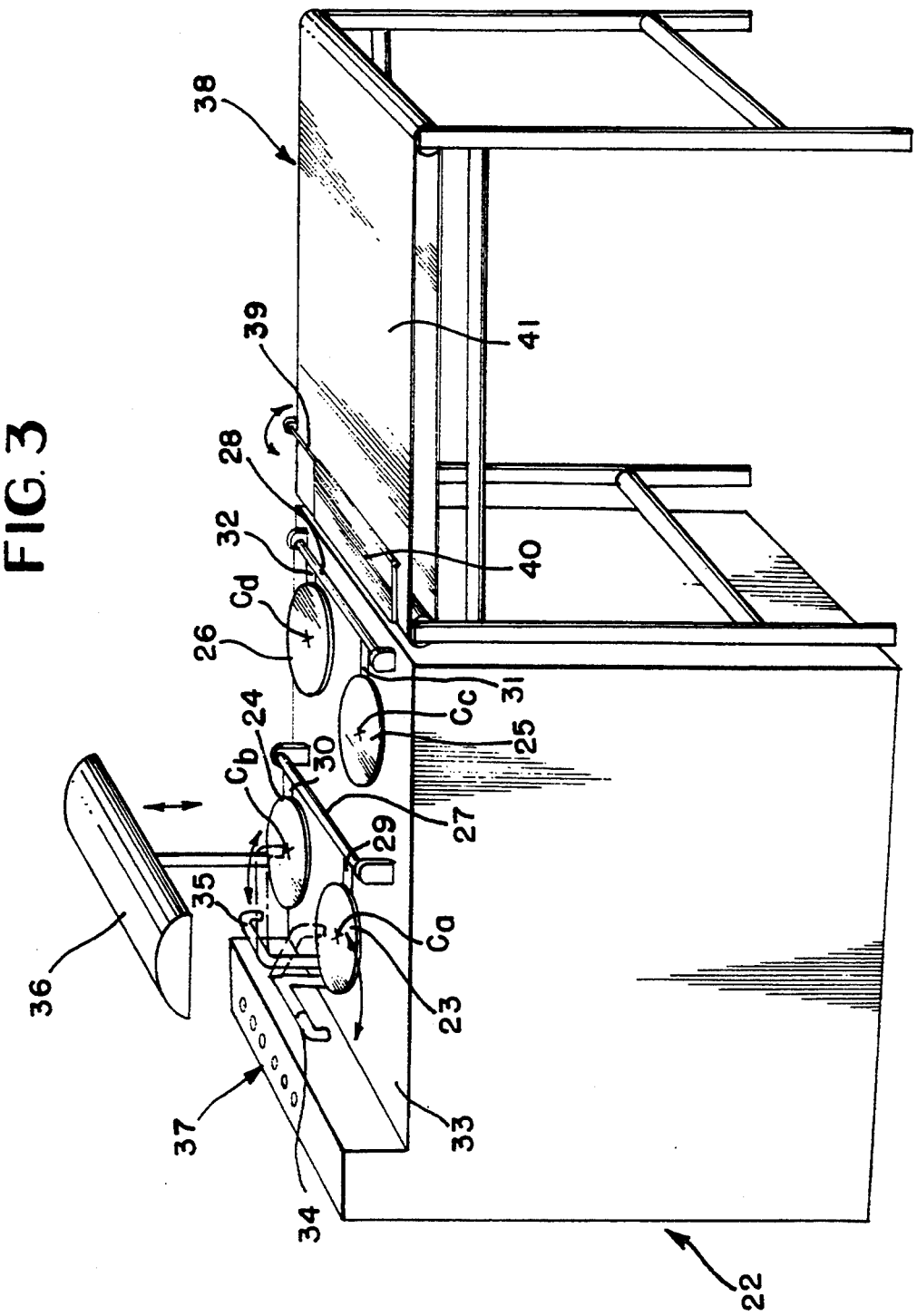

METHOD OF BAKING USING A PLURALITY OF PIVOTABLE PLATES

BACKGROUND OF THE INVENTION

1. Field of the Invention

This invention relates to a method of baking using an apparatus having at least two heated plates, each of them having a top side being used, and a dough or a batter being automatically put on the first heated plate, possibly after a portion of dripping is placed on the plate, for making a pastry, a pancake or the like. The invention also relates to different embodiments of an apparatus for carrying out the method.

2. Description of the Background Art

It is previously known to make for instance waffles and pancakes by using electric waffle irons/pancake irons. In that connection, batter is put on the one plate of the waffle iron, possibly after a portion of dripping is placed on the plate for easily separating the waffle/pancake, whereafter the other plate of the waffle iron is put over the first one. There are at least three drawbacks connected with this procedure. Firstly, the waffle/pancake does not become sufficiently brown and fine on its top side. Secondly, the moisture of the batter is enclosed between the two electric plates lying against each other, whereby the baked waffle/pancake is often provided with blisters which is not attractive for the person who shall taste the pastry. Thirdly, there is a risk that the baked waffle/pancake is fastened to the upper plate, which deteriorates the possibility to separate the same after it is baked. The reason for the deterioration is that it is not possible to put a portion of dripping on the upper plate since it shall be turned down over the lower one.

SUMMARY OF THE INVENTION

This invention relates to a new method and new apparatuses for removing the problems with known technique. The invention also relates to supplying an equipment which is based on a principle of modules, whereby the number of pastries, pancakes or the like which are baked simultaneously can be one or more. Due to this fact the invention can be a great importance principally in major plants, for instance in major kitchens, in schools, in hospitals and in military camps. Another purpose of the invention is that at least the apparatus that is to be used in major plants will be automated, whereby the baking can be carried out without considerable manual work. The manual work in this case is to take away the pastries or the pancakes from a laying off place.

According to the invention the new method is characterized by the following steps:

The dough or the batter is baked on its one side on the top side of the first plate which has taken a first, essentially horizontal position, whereafter this one is automatically forced to take a second, essentially horizontal position essentially straight above the second heated plate with its top side directed towards the second plate;

The partly baked dough or batter lands on the second plate which has taken a first essentially horizontal position and is baked on its other side, at the same time as the first plate is automatically returned to its initial position for reception of a new portion of dough or batter; and The pastry/pancake finally baked on the second plate is automatically transferred to a laying off place, positioned on a level at least somewhat below the level of the second plate, by the fact that the plate is automatically forced to take a second essentially horizontal position above the laying off place with its top side directed towards this one, whereby the finally baked pastry/pancake lands on the laying off place.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A number of embodiments of an apparatus according to the invention shall now be described more closely with reference to the accompanying drawings wherein FIG. 3 shows a perspective view of a third, preferred embodiment of the apparatus.

DETAILED DESCRIPTION OF THE INVENTION

Figure 1:
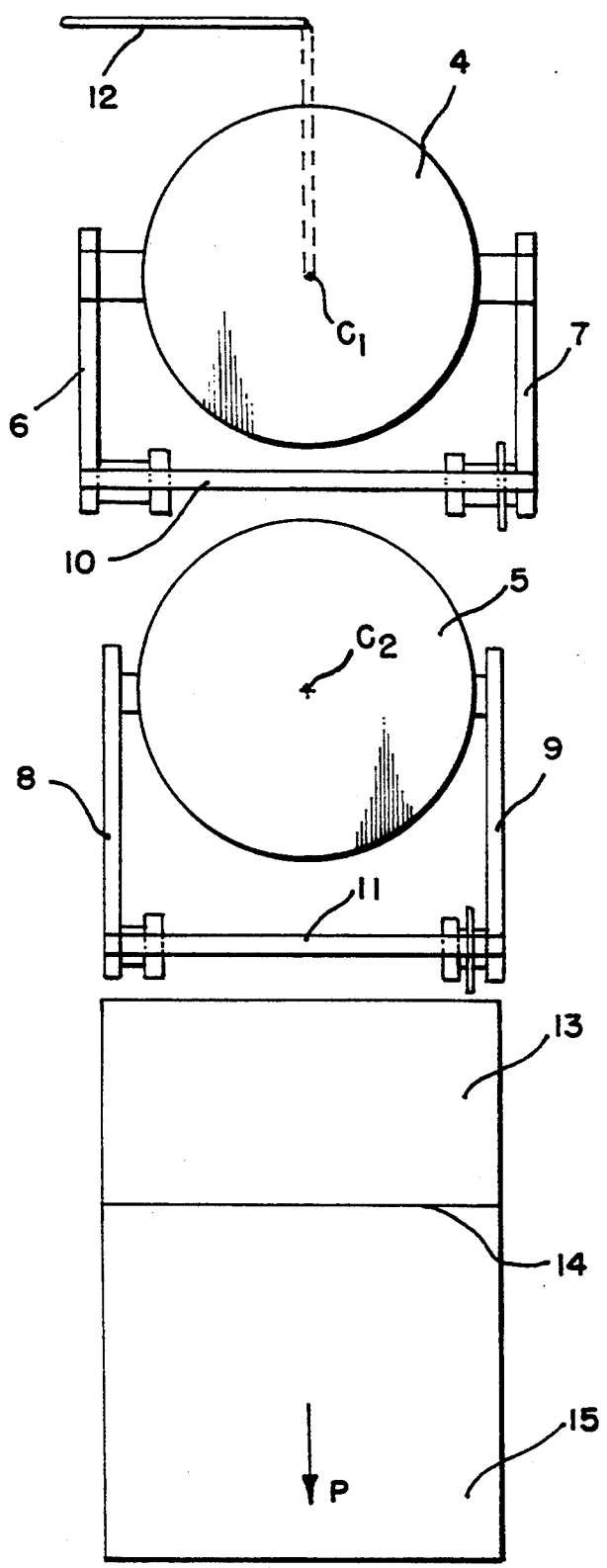
FIG. 1 shows a schematical sketch of a top plan view of a first embodiment of the apparatus suitable to be used in major kitchens.

In FIG. 1 there is shown a first embodiment of the apparatus comprising two plates 4, 5. Each plate, which is suitably made of cast iron and provided with electric wires for heating, preferably has a circular form and is suspended in the fore ends of two arms 6, 7 and 8, 9, respectively, which are positioned on each side of the plate. The rear ends of the arms 6, 7; 8, 9 are connected by a rod 10, 11, which is directed essentially perpendicularly to the longitudinal direction of the arms 6, 7, 8, 9, and which constitutes a hinge for the plates 4, 5. Due to this fact, the plates 4, 5 can be pivoted from its essentially horizontal position, shown in FIG. 1, to its second essentially horizontal position where the top side of the plates, shown in the figure, are directed downwardly. The rod 10 is so positioned that the distance between this one and the centre $C_1$ of the plate 4 is essentially the same as the distance between the rod 10 and the centre $C_2$ of the second plate 5. Therefore the plate 4 comes essentially straight above the plate 5, when the arms 6, 7 are pivoted about the hinge 10. Of course, it is possible to arrange the plates 4, 5 in different ways. Instead of providing the plates 4, 5 themselves with electric wires, the electric wires can be applied to an underlying plate against which each of the plates 4, 5 rests. Thus, if the plates 4, 5 are made of a relatively thin material, a good heat transfer can be made between underlying plates and the plates 4, 5.

The plates 4, 5 are at their edge portion suitably provided with a flange, directed upwards and going round the plate. The flange is intended to prevent the dough or the batter from flowing outside the plate in connection with the application.

The plates 4, 5 in normal position, i.e. when baking is performed, have such a placing that they are in essentially the same horizontal plane. The plate 4 is pivotable by means of the hinge 10 to a position above the plate 5. Due to this fact the new method can be carried out in an effective way.

The dough or the batter is put on by a means 12 which comprises a pumping device and which is schematically shown in the figure. This means 12 which is intended to deliver a portion of dough or batter is pivotable from an area outside the plate 4 to an area above the plate, and in that position the nozzle of the means can be placed straight above the centre $C_1$ of the plate 4. Then the dough or the batter flows out towards all directions on the plate, and therefore a more even thickness of the pastry or the pancake is achieved. In order to prevent dripping afterwards, the nozzle of the means 12 is at its outer portion provided with a ball valve which is intended to move between a closed and an open position and vice versa.

The apparatus according to FIG. 1 also has a means (not shown) for applying the dripping for easily separating the baked dough or batter. This means is so made that it can deliver a little portion of dripping about at the middle of the plate 4 just before the dough or the batter is applied. Thus, when applying the dough or the batter the dripping flows out towards the edges of the plate 4, whereby the separation of the pastry or the pancake from the plate is facilitated.

As mentioned previously also the plate 5 according to this embodiment can be pivoted from its essentially horizontal position, shown in the figure, to its second, essentially horizontal position, in which the pastry or the pancake is separated from the plate 5. This means that the pastry or the pancake which preferably has a circular form in similarity with the plate can be laid off on an adjacent laying off place. In this case the laying off place comprises a plate 13 which can be rectangular and is pivotable about an essentially horizontal hinge 14 and an endless conveyer belt 15 which is intended to move momentarily in the direction of the arrow P. The distance between the rod 11 and the centre $C_2$ of the plate 5 is essentially the same as the distance between the rod 11 and the hinge 14. This means that when the plate 5 is pivoted over to its second horizontal position, the centre of pastry or the pancake lands about at the hinge 14. If then the plate 13 is pivoted upwards about the hinge 14, the circular pastry/pancake is folded up to a halfmoon with a placing at the conveyer belt 15. This one is thereafter moved a couple of centimeters forwards, whereby the next halfmoon-formed pastry/pancake lands on top of the first one and in an overlap relationship to this one.

When using the apparatus according to FIG. 1 for baking a dough or a batter, the apparatus is started by the fact that a bottom is pushed in. When the plates 4, 5 have become so warm that baking can be carried out, an application of a portion of dripping for easily separating the dough or batter is made onto the plate 4, whereafter the dough or the batter is applied onto the plate 4 by the means 12. The dough or the batter is baked about a minute on the plate 4, whereafter the plate 4 is pivoted over towards the plate 5 so that the partly baked pastry or the pancake lands on the plate 5 for baking the other side of the pastry/pancake. At the same time the plate 4 returns to its initial position for reception of new portion of dripping and a new portion of dough or batter for new baking. The plate 5 is then pivoted over to its second, essentially horizontal position, the pastry/pancake with its second, centre portion landing about at the hinge 14. The plate 13 is then pivoted over towards the conveyer belt 15, whereby the pastry/pancake becomes halfmoon-formed and is placed on the conveyer belt 15. Then it is moved forwards a couple of centimeters in the direction of the arrow P so that the next pastry/pancake lands on top of the first one and in an overlap relationship.

These processes describe above can of course be mechanized and be automated so that an automatic baking machine with the above mentioned functions can be produced. Thus there is a main intention with this invention to produce an automatic baking machine which works in accordance with the above mentioned principles.

Of course, it is possible to build together several such units shown in FIG. 1, whereby the capacity of the apparatus can be essentially increased. In such cases with several units built together it is possible to bake pastries on the one unit and to make pancakes on the other unit.

Figure 2:
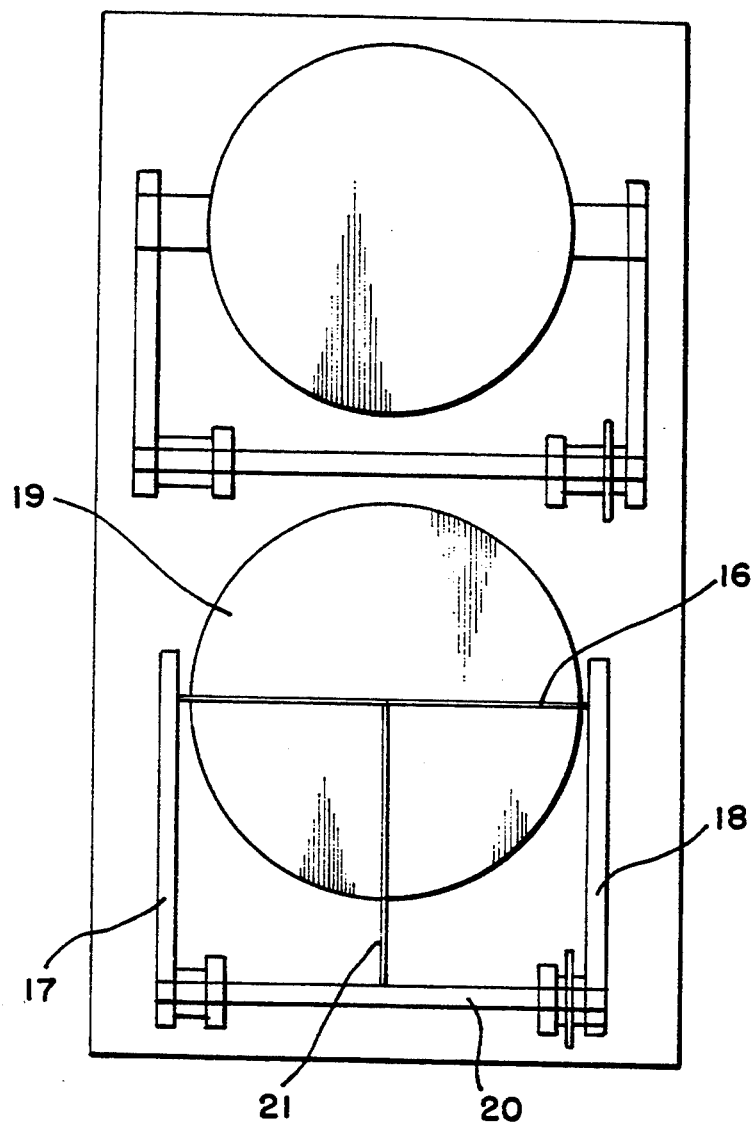
FIG. 2 shows a schematical sketch of a top plan view of a second embodiment of the apparatus.

In FIG. 2 there is shown a second embodiment of the apparatus. This embodiment has great similarities with the embodiment according to FIG. 1. An essential difference, however, is that the first mentioned apparatus has a means by which the pastry/pancake gets the halfmoon-form directly at the transfer from the position according to the figure to the laying off place. This means comprises a wire 16 which connects the outer ends of the pivoting arms 17, 18 with each other. The wire extends essentially perpendicularly to the longitudinal direction of the arms 17, 18 and is positioned about at the middle of the essentially circular plate 19 which in this case is stationarily fastened in the apparatus.

The arms 17, 18 are pivotable by means of a rod 20 which is turnably journalled in the apparatus and which connects the rear ends of the arms 17, 18. From the rod 20 extends another wire 21 which is connected to the wire 16 about at the middle, the wire 21 forming essentially a right angle with the wire 16. In order that the pastry/pancake surface which is as smooth as possible when it is baked finally on the plate 19, the wire 16, 21 are immersed into grooves of the plate 19.

When the finally baked pastry/pancake is moved to a laying off place, for instance a conveyer belt, the arms 17, 18 are pivoted about the hinge 20, whereby the pastry/pancake is caught by wires 16, 21. During the continued pivoting movement of the arms 17, 18 the upper half of the pastry/pancake falls down towards the lower half, whereby a halfmoon-formed pastry/pancake can be laid down on the conveyer belt. When the arms 17, 18 are pivoted back, the conveyer belt is suitably moved a couple of centimeters forwards, whereby the pastry/pancake can maintain its form.

In FIG. 3 there is a preferred embodiment of an apparatus according to the invention. This embodiment comprises a table 22 on which there are arranged four plates 23–26. The plates are arranged beside each other in couples so that the first couple 23, 24 is pivotably arranged on a first rod 27, which preferably is tubular, whereas the second couple 25, 26 is pivotably arranged on a second, tubular rod 28. Each of the plates 23, 24 is arranged on top of a tubular girder 29, 30 which is positioned essentially perpendicularly from the first rod 27. In the same way each of the plates 25, 26 is arranged on top of a tubular girder 31, 32, which is positioned essentially perpendicularly from the second rod 28.

The two rods 27, 28 which are arranged in essentially the same horizontal plane, are positioned in a certain distance from the top side 33 of the table 22, the distance being suitably between 5 and 15 cm. Since each couple 23, 24; 25, 26 of plates is positioned on essentially the same level as respective rod 27, 28, there arises an essentially free space under the plates and under the rods, which has the consequence that the top side of the table suitably made of a stainless plate is very easy to clean.

The tubular rods 27, 28 are positioned on essentially the same level above the top side of the table, i.e. it may differ only by a few centimeter regarding the distance between respective rod and top side of the table. The rod 24 is suitably positioned a few centimeters higher than the rod 28.

The tubular rods 27, 28 and the tubular girders 29, 30; 31, 32 are so designed that they enclose the electrical wires for respective plate. Due to this fact there is a simple and efficient arrangement of wires.

As is apparent from the figure, the apparatus is provided with two means 34, 35 which are intended to apply dough/batter and flowing dripping on respective plate 23, 24. Each means 34, 35 is pivotable from a position outside respective plate to a position above respective plate and essentially at the middle of the plate.

According to a preferred embodiment, the table 22 comprises a heating device 36 which is intended to be positioned above the plates 23, 24 and to be raisable and lowerable in relation to these plates. By connecting the heating device 36 and keeping it on a suitable level above the plates 23, 24, it is possible to hurry facilitate the coagulation of the batter which is applied onto these plates.

At the fore portion of the table 22 there is arranged an operation desk 37 for controlling the apparatus.

The distance between the centres $C_a$, $C_b$ of the first couple 23, 24 of plates and the rod 27 is essentially the same as the distance between this rod and the centres $C_c$, $C_d$ of the second couple 25, 26 of plates. Due to this arrangement the partly baked dough/batter from the plates 23, 24 lands on top of the plates 25, 26 when the rod 27 is pivoted.

As is apparent from the figure the apparatus shown there has a laying off place 38 for the finally baked pancake/pastry. This laying off place which is positioned on essentially the same level as the table 22 comprises a plate 40 which is pivotable about a shaft 39 and an endless movable conveyer belt 41 which cooperates with this plate. The distance between the centres $C_c$, $C_d$ of the plates 25, 26 and the rod 28 is essentially the same as the distance between this rod and the shaft 39 of the plate 40, which shaft extends essentially across the conveyer belt 41. This means that when the plates 25, 26 are pivoted over to the conveyer belt 41 the centres of the finally baked pancakes/pastries land on the shaft 39. This has the consequence that when the plate 40 is pivoted about this shaft, there are formed two half-moon-formed pancakes/pastries. By moving the conveyer belt a couple of centimeters forwards the next couple of pancakes/pastries can be placed on top of the first couple of pancakes/pastries and in an overlap relationship.

Of course, it is possible that the apparatus shown in FIG. 3 instead of having a fore couple 23, 24 of plates and a rear couple 25, 26 of plates to arrange several fore couples of plates and several rear couples of plates or to have only one fore plate and only one rear plate.

Even if this embodiment according to FIG. 3 of the invention is to prefer, it is possible to make modifications of the same. Thus, at the first hand the length of the first pivoting arms 29, 30 and 31, 32, respectively, can be varied. Partly the distance between the pivoting shaft 27 (i.e. the shaft about which the pivoting arms are pivoting) and the centres $C_c$ and $C_d$ of the place 25, 26, and the distance between the pivoting shafts 28, 29 can be varied. Secondly, an embodiment is possible according to which a plate baking the pastry/pancake on the one side is arranged on a level above the second plate baking the other side of the pastry/pancake. In that connection the upper plate is positioned essentially straight above the second plate and has accordingly no pivoting arms the length of these ones are the same as zero), but the centre of the plate is positioned on the pivoting shaft itself. When rotating this plate half a revolution, its top side accordingly lands on the underside and is directed towards the top side of the underlying plate. In order that this rotation of the upper plate can be performed, the distance between the upper and lower plate should be somewhat larger than half the diameter of the upper plate.

The transfer of the pastry/pancake from the lower plate to the laying off place/conveyer belt may either be made by placing the centre of the plate on the pivoting shaft 28 and by rotating the plate half a revolution so that the top side of the plate lands on the underside and, the pastry/pancake landing on the underlying laying off place/conveyer belt or by having the plate 25/26 to make a pivoting movement about the pivoting shaft 28 by means of pivoting arms as in FIG. 3 so that the top side of the plates 25/26 lands above the laying off place/conveyer belt positioned beside the plate, whereby the pastry/pancake is transferred onto the laying off place/conveyor belt.

The greatest advantages with this new invention are the following:

1. Due to the fact that the apparatus has received the design according to the invention, the essential advantage is achieved in that the pastry/pancake after folding has its most beautiful part on the visual portions of the pastry/pancake folded up;
2. The pastries and/or pancakes have a fine surface without bubbles since the moisture being in the dough and/or the batter disappears up in the air because no above lying plate acts as an obstacle for the moisture;
3. The pastries and/or the pancakes are easy to separate after the final baking, because the dripping being in the pastry and/or the pancake during the transfer from the one plate to the other plate is sufficient to grease the last mentioned plate;
4. The apparatus is made in such a way that it can be easily automated which means that the different processes are performed automatically after each other. Due to this fact a very great number of pastries and/or pancakes can be produced per unit with a minimum manual work;
5. Several units can be connected to each other, whereby the capacity of the apparatus increases still even more.

If the apparatus according to the invention is intended for major operations it is suitable to arrange a computer in which the movements of the devices being integral parts of the apparatus can be programmed, whereby the various steps of baking moments can be carried out automatically in turn.

The invention is of course not limited to the described and shown embodiments but can be modified within the scope of the following claims.

I claim:

1. A method of baking wherein at least two heated plates are utilized, each of them having a top side, and dough or batter being automatically positioned on the first heated plate after applying a portion of dripping on the plate for easily separating therefrom, for making pastries and pancakes, comprising the combination of the following steps:

baking the dough or batter on its one side on the top side of the first plate which is positioned in a first essentially horizontal position, whereafter the first plate is automatically forced to take a second essentially horizontal position beside the first position and essentially straight above a second heated plate with its top side directed towards the second plate;

positioning the partly baked dough or batter on the second plate which has taken a first essentially horizontal position;

baking the other side of the dough or batter on the second plate at the same time as the first plate automatically returns to its initial position for reception of a new portion of the dough or batter; and automatically and pivotably transferring the baked dough or batter to a laying off place, placed beside the second plate on a level at least somewhat below the level of the second plate, by the fact that the second plate is automatically forced to take a second essentially horizontal position above the laying off place with its top side directed thereto whereby the finally baked pastry/pancake is positioned on the laying off place wherein the pastry/pancake is automatically folded up in connection with the transfer to the laying off place.

2. A method according to claim 1, wherein a conveyer belt functioning as a laying off place for the pastry/pancake and being arranged to move momentarily in a direction away from the plates, and wherein the transfer of the pastry/pancake to the conveyer belt is automatically made in such a way that the pastry/pancake is placed on the conveyer belt which moves a distance in the direction away from the plates, the next pastry/pancake being placed either on top of or beside the previous one closer to the second plate.

3. An apparatus usable for carrying out the baking of pastries and pancakes comprising at least two heatable plates, first and second plates each having a top side comprising the combination of the following features:

the first plate is pivotable about a first hinge for positioning the first plate in a position essentially straight above the second plate with its top side directed towards the second plate; and the second plate in its turn is pivotable about a second hinge for positioning the second plate in a position above a laying off place with its top side directed thereto.

4. An apparatus according to claim 3, wherein the first plate and the second plate in a normal position are arranged in essentially the same horizontal plane.

5. An apparatus according to claim 4, wherein each plate is fastened to the fore ends of two arms which are placed on each side of the plate, and that the rear ends of the arms are connected to a rod which is directed essentially perpendicularly to the longitudinal direction of the arms and which constitute a hinge of the plates.

6. An apparatus according to claim 5 wherein the rod of the first plate is so positioned that the distance between the rod and the center of the first plate is essentially the same as the distance between the rod and the center of the second plate.

7. An apparatus according to claim 6, wherein means are arranged for selectively applying dripping and dough or batter onto the first plate and for delivering a portion of the dripping and a portion of the dough or batter essentially at the middle of the first plate.

8. An apparatus according to claim 7, and further including a conveyer belt for moving away from the plate and a surface which is pivotable about an essentially horizontal hinge and which is positioned between the pivotable surface and the conveyer belt and that the distance between the rod of the second plate and the center of the second plate is essentially the same as the distance between the rod of the second plate and the hinge.

9. An apparatus according to claim 8, wherein the pivotable surface is pivotable to provide automatic folding of the baked dough or batter.

10. An apparatus according to claim 4, wherein each plate is arranged on top of a girder each girder being fastened to a rod constituting a hinge for pivotably mounting the plates about the respective hinge.

11. An apparatus according to claim 10, the plates being arranged at a table having a top side wherein each plate including a rod is positioned above the top side of the table.

12. An apparatus according to claim 11, wherein a heating means is raisably and lowerably arranged at the table above the plates.

13. An apparatus according to claim 10 wherein the rod of the first plate is so positioned that the distance between the rod and the center of the first plate is essentially the same as the distance between the rod of the first plate and the center of the second plate.

14. An apparatus according to claim 4, wherein the movements of the devices being integral parts of the apparatus are automated and the movements are carried out in turn.

* * * * *